United States Patent
Schäfer

(10) Patent No.: US 12,257,741 B2
(45) Date of Patent: Mar. 25, 2025

(54) METHOD AND DEVICE FOR RECYCLING PLASTICS

(71) Applicant: BB Engineering GmbH, Remscheid (DE)

(72) Inventor: Klaus Schäfer, Remscheid (DE)

(73) Assignee: BB Engineering GmbH, Remscheid (DE)

( * ) Notice: Subject to any disclaimer, the term of this patent is extended or adjusted under 35 U.S.C. 154(b) by 906 days.

(21) Appl. No.: 17/294,526

(22) PCT Filed: Nov. 19, 2019

(86) PCT No.: PCT/EP2019/081756
§ 371 (c)(1),
(2) Date: May 17, 2021

(87) PCT Pub. No.: WO2020/104432
PCT Pub. Date: May 28, 2020

(65) Prior Publication Data
US 2021/0402651 A1 Dec. 30, 2021

(30) Foreign Application Priority Data
Nov. 22, 2018 (DE) ..................... 10 2018 009 171.7

(51) Int. Cl.
| | | |
|---|---|---|
| *B29B 17/02* | (2006.01) |
| *B01D 19/00* | (2006.01) |
| *B01D 36/00* | (2006.01) |
| *B29B 9/02* | (2006.01) |
| *B29C 48/69* | (2019.01) |
| *B29C 48/694* | (2019.01) |

(52) U.S. Cl.
CPC .......... *B29B 17/02* (2013.01); *B01D 19/0031* (2013.01); *B01D 36/001* (2013.01); *B29B 9/02* (2013.01); *B29C 48/69* (2019.02); *B29C 48/694* (2019.02); *B29B 2017/0217* (2013.01); *B29B 2017/0255* (2013.01)

(58) Field of Classification Search
CPC ..................................................... B29B 17/02
See application file for complete search history.

(56) References Cited

U.S. PATENT DOCUMENTS

| | | | | |
|---|---|---|---|---|
| 4,832,882 A | * | 5/1989 | Moylan ................. | B01D 29/96 425/185 |
| 7,108,500 B2 | * | 9/2006 | Bacher ................... | B29B 17/00 425/197 |
| 2012/0091609 A1 | * | 4/2012 | Feichtinger ......... | B29B 17/0412 241/98 |
| 2018/0327583 A1 | * | 11/2018 | Ek ............................ | C08J 3/201 |

FOREIGN PATENT DOCUMENTS

| | | | |
|---|---|---|---|
| DE | 231029 A1 | | 12/1985 |
| EP | 3363609 A1 | | 8/2018 |
| WO | WO2005087477 | * | 9/2005 |
| WO | 2014040099 A1 | | 3/2014 |

OTHER PUBLICATIONS

EP2853374 translation (Year: 2015).*
EP2853374 original (Year: 2015).*
KR100883317 translation (Year: 2009).*
KR100883317 original (Year: 2009).*
DD231029 original (Year: 1985).*
WO 0078524 original (Year: 2000).*
WO 0078524 translation (Year: 2000).*
DD231029 (Year: 1985).*
DD231029 translation (Year: 1985).*

* cited by examiner

*Primary Examiner* — Irina Krylova
(74) *Attorney, Agent, or Firm* — BainwoodHuang

(57) ABSTRACT

Techniques recycle plastics in multiple successive process steps. A polymer, preferably a recyclable material, is melted using a discharge extruder, filtered using a first filter device under a positive pressure atmosphere, filtered and degassed using a degassing device, and discharged using a discharge extruder. The degassing device has at least one filter element and a vacuum chamber with a negative pressure atmosphere for filtering and degassing purposes, wherein the plastic melt can be conducted into the negative pressure atmosphere of the vacuum chamber through the filter element.

9 Claims, 5 Drawing Sheets

METHOD AND DEVICE FOR RECYCLING PLASTICS

Figure 1:
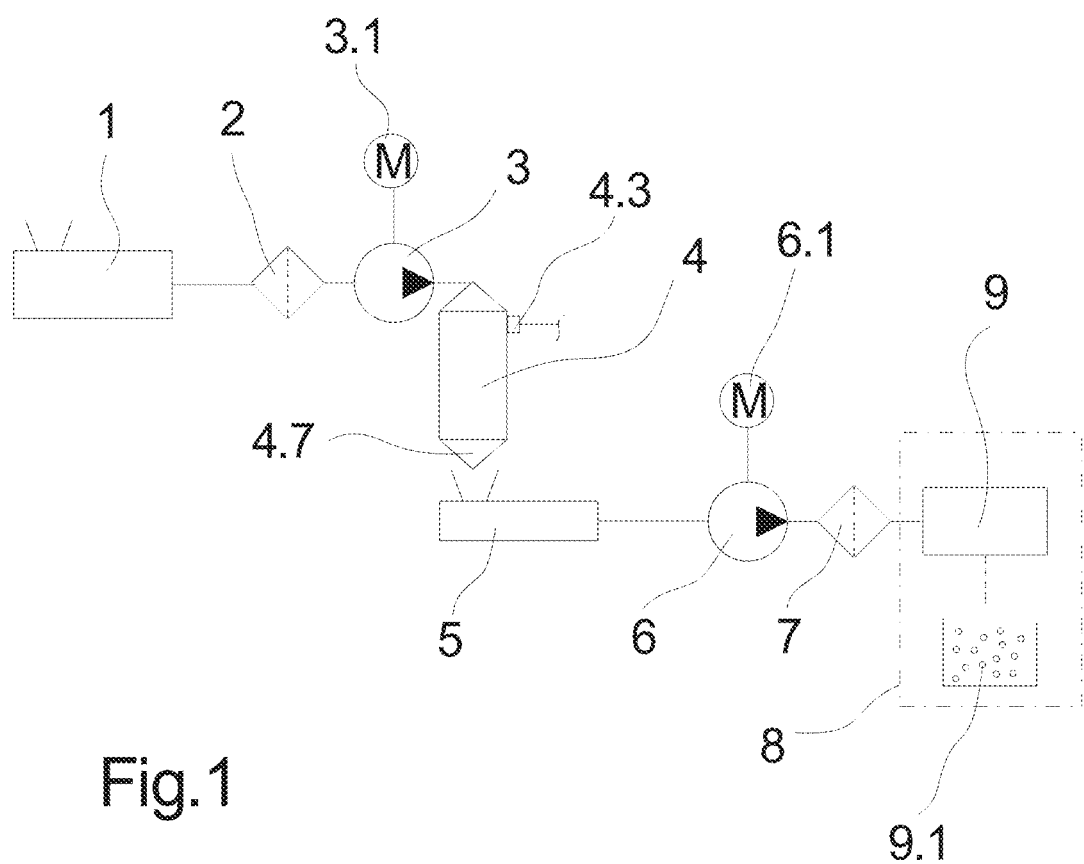

The invention relates to a method for recycling plastics in a plurality of successive process steps and to a device for recycling plastics as disclosed herein.

Owing to the increasing amount of plastic waste worldwide, such as "PET" bottles, materials recycling for the recovery of plastics is becoming increasingly important. Thus, the prior art describes numerous methods and devices for recycling plastics in order to melt a recyclable material and then intensively filter and degas the plastic melt to obtain a polymer melt which is of as high purity as possible for reuse. Such a method and device of the type in question for recycling plastics is disclosed, for example, in EP 2 853 374 A1.

In the known method and the known device for recycling plastics, a recyclable material is first of all melted and then freed from impurities by filtration. The plastic melt is then degassed in a section of a screw extruder. Long dwell sections are required here to produce sufficient contact between the plastic melt and a vacuum atmosphere so that all volatile constituents can be removed from the plastic melt. Fundamentally, however, such elongated degassing zones have the disadvantage of long dwell times, which promote the risk of decomposition substances forming within the plastic melt. Owing to the limited space and the low degassing capacity, a plurality of degassing stages is also often used, increasing the degassing capacity without, however, allowing the melt viscosity to be influenced.

It is then an object of the invention to provide a method and a device for recycling plastics by means of which plastics which are of as high purity as possible can be produced without foreign particles and gases.

A further object of the invention is to achieve recovery of the plastic melt with as few process steps as possible.

According to the invention, this object is achieved by a method having features as disclosed herein and by a device having features as disclosed herein.

Advantageous developments of the invention are defined by the features and combinations of features as disclosed herein.

The invention has the particular advantage that, according to the invention, the process steps of filtration and degassing that are usually performed can be carried out in one process step. The filtered plastic melt can be degassed directly by filtration in a vacuum atmosphere. Large-area contact zones between the plastic melt and the vacuum atmosphere can thus be achieved so that the volatile constituents can be released from the plastic melt in a relatively short dwell time. Moreover, a high degree of purity in the plastic melt can be produced by the multi-stage filtration.

By a first filtration of the plastic melt under an excess pressure atmosphere, it is possible in this way first of all to remove coarse solid particles and impurities from the melted recyclable material. The subsequent second filtration with integrated degassing can be carried out correspondingly finely in order to remove the solids first before the actual degassing. As a result, the plastic melt is additionally homogenized to a high degree, enabling it subsequently to be discharged directly for final processing. In particular, in addition to filtration and degassing, the viscosity of the melt can also be built up again.

The device according to the invention makes it possible to recover a pure plastic with little outlay in terms of apparatus. For this purpose, the degassing unit has at least one filter element and a vacuum chamber having a vacuum atmosphere, wherein the plastic melt can be passed through the filter element into the vacuum atmosphere of the vacuum chamber. Depending on the configuration of the filter element, very large effective areas for degassing the filtered plastic can thus be obtained. The dwell times for degassing the plastic melt can thus be reduced to a minimum.

In order to permit the escape of the volatile foreign substances from the plastic melt within the vacuum chamber, the vacuum atmosphere is set to a vacuum in the range of from 0.5 mbar to 50 mbar. Here, the vacuum atmosphere within the vacuum chamber is selected as a function of a layer thickness of the plastic melt at an outlet surface of the filter element. In this way, a relatively high vacuum can be produced in order to obtain intensive degassing in the case of relatively thick melt layers.

According to an advantageous development of the invention, the purified polymer melt is collected in a vacuum chamber sump formed below the filter element and is discharged through a melt outlet. It is possible to achieve a continuous flow of melt, thus enabling the plastic melt to be fed continuously to the discharge extruder for discharge after degassing.

The method variant in which, after filtration and degassing, the plastic melt is fed under a vacuum atmosphere to a dwell reactor for homogenization and continuation of degassing is particularly advantageous for increasing what is referred to as the intrinsic viscosity (IV value). In this way, IV values >0.6 and also >0.8 can be achieved in a previously degraded PET plastic melt.

For this purpose, the device according to the invention has a dwell reactor which is connected to the degassing unit on an inlet side. In addition, the dwell reactor has a vacuum connection in order to produce the vacuum atmosphere by means of a vacuum pump.

In this case, the plastic melt is circulated within the dwell reactor and fed to a reactor outlet by a driven worm shaft.

To process the plastic melt, there is furthermore a preference for carrying out the method variant in which the plastic melt is filtered for a third time under an excess pressure atmosphere as it is discharged for final processing and is then mixed dynamically or statically with an additive. To this extent, high-purity colored and/or additive-containing plastic melts can also be fed directly to final processing.

In order to be able to produce a continuous flow of melt to final processing, the device according to the invention has a discharge pump which is arranged downstream of the discharge extruder and interacts with a final filter unit.

A dynamic mixer with a secondary extruder is furthermore provided for mixing in additives, e.g. color pigments, said mixer being arranged directly upstream of final processing. By using vacuum filtration according to the invention and a dynamic or static mixer, the intrinsic viscosity and the additive content of the melt can be optimized exactly to the product to be produced.

The final processing unit is formed by a granulation device for granulating the plastic melt or by an extrusion device for extruding the plastic melt into fibers or films. As a result, there is the possibility of feeding the plastic granules produced to a separate extrusion process. Alternatively, however, the processed plastic melt can be used directly to produce fibers or films, which are produced in the extrusion device.

The method according to the invention for recycling plastics is explained in greater detail below by means of a number of exemplary embodiments of the device according to the invention for recycling plastics with reference to the attached figures.

Figure 2:
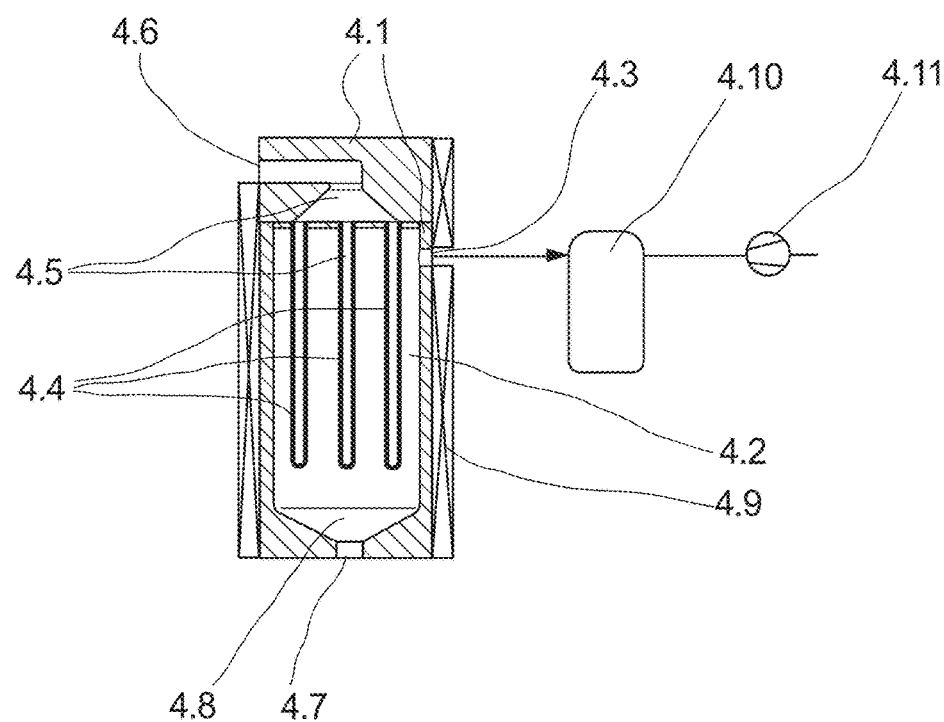

Of these:

FIG. 1 shows schematically a first exemplary embodiment of the device according to the invention for recycling plastic FIG. 2 shows schematically a cross-sectional view of an exemplary embodiment of a degassing unit of the exemplary embodiment in FIG. 1

Figure 3:
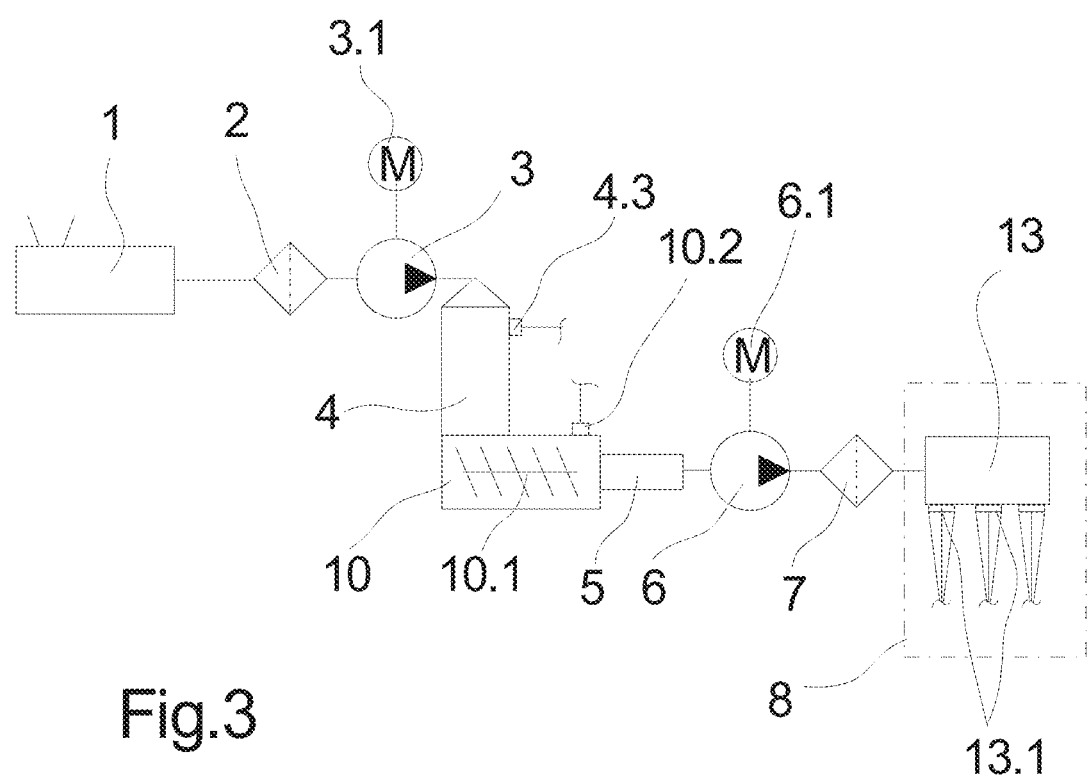
Figure 4:
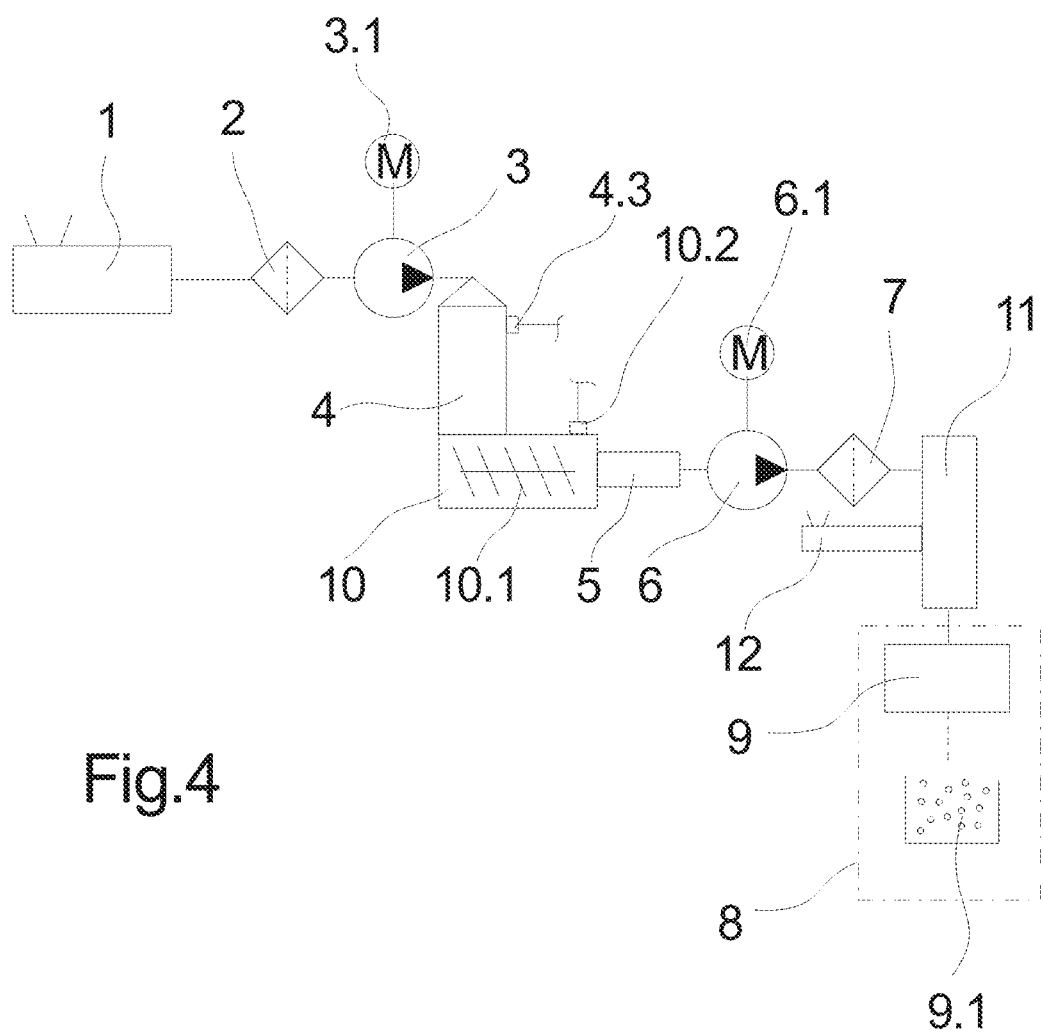
Figure 5:
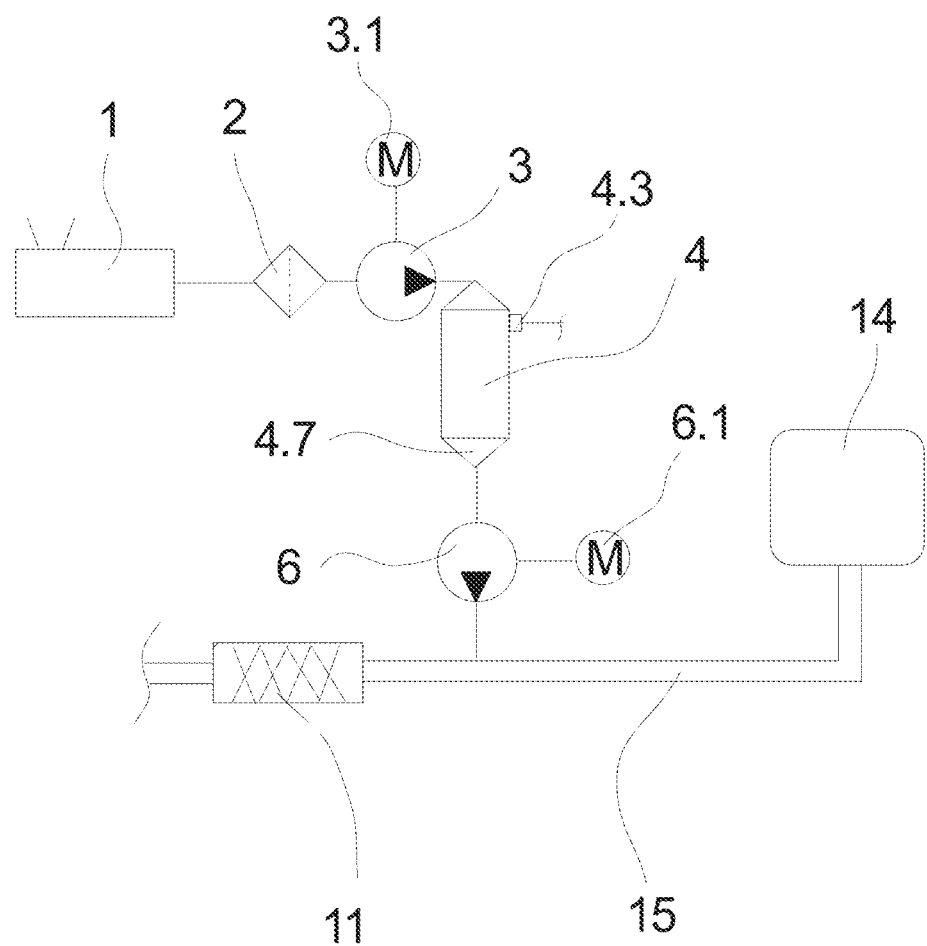

FIG. 3 shows schematically a further exemplary embodiment of the device according to the invention for recycling plastic FIG. 4 shows schematically a further exemplary embodiment of the device according to the invention for recycling plastic FIG. 5 shows schematically a further exemplary embodiment of the device according to the invention for recycling plastic FIG. 1 shows schematically a first exemplary embodiment of the device according to the invention for recycling plastic. The exemplary embodiment has a melting extruder 1. The melting extruder 1 can be of single- or multi-shaft design and is connected by an extruder outlet 1.1 to a filter unit 2. The filter unit 2 is followed by a melt pump 3, which is driven by means of a pump drive 3.1. The melt pump 3 is connected to a degassing unit 4. The degassing unit 4 has a melt outlet 4.7, which is associated with a discharge extruder 5. The discharge extruder 5 is followed by a discharge pump 6 with the pump drive. 6.1 and a final filter unit 7. Associated with the final filter unit 7 is a final processing unit 8, which in this exemplary embodiment is formed by a granulating device 9.

In order to explain the degassing unit 4, reference is now made to the illustration in FIG. 2, in which the degassing unit 4 is illustrated in a cross-sectional view.

The degassing unit 4 has a housing 4.1, which in this case is formed by a cylindrical pot, a cover. A vacuum chamber 4.2 is formed within the housing 4.1. A plurality of filter elements 4.4 in the form of hollow cylindrical filter cartridges is arranged within the vacuum chamber 4.2. In the interior, the filter elements 4.4 have a pressure chamber 4.5, which is connected to a melt inlet 4.6 on the housing 4.1. The filter elements 4.4 are closed at the freely projecting end and have a permeable filter wall.

Below the free end of the filter elements 4.4, a sump 4.8 is formed in the vacuum chamber. The sump 4.8 is connected to a melt outlet 4.7 in the housing 4.1. The melt outlet 4.7 is arranged centrally in the bottom of the housing 4.1, wherein the sump 4.8 extends in a funnel shape above the melt outlet 4.7.

The vacuum chamber 4.2 is connected via a vacuum connection 4.3 to a collecting container 4.10 and a vacuum pump 4.11.

A heating unit 4.9 is arranged on the circumference of the housing 4.1. The heating unit 4.9 preferably has electrical heating means, which are not shown here.

To explain the functioning of the exemplary embodiment according to FIG. 1 and of the degassing unit according to FIG. 2, reference is made to both figures.

An already processed recyclable material, for example PET flakes, is fed to the melting extruder 1, which could preferably be designed without, but also with, a vacuum unit. The melting extruder 1 melts the recyclable material to form a plastic melt, which is fed to the filter unit 2 via the extruder outlet 1.1. In the filter unit 2, the plastic melt is pre-filtered with a relatively coarse filter fineness in order to remove foreign particles and unmelted particles of the recyclable material from the plastic melt. During this process, the plastic melt is filtered in an excess pressure atmosphere, which is essentially produced by the discharge extruder 1. The pre-filtered plastic melt is taken up by the melt pump 3 and fed to the degassing unit 4 under a predefined operating pressure.

The plastic melt passes via the melt inlet 4.6 into the pressure chamber 4.5 of the degassing unit 4 and passes through the filter elements 4.4. In the process, the plastic melt enters the vacuum chamber 4.2 of the degassing unit. A vacuum atmosphere is produced within the vacuum chamber 4.2 by means of the vacuum pump 4.11. In this case, the vacuum atmosphere is set to a value in the range of from 0.5 mbar to a maximum of 50 mbar. A vacuum in the vacuum chamber 4.2 of <2 mbar is preferably set. The gases and volatile constituents escaping from the plastic melt owing to the vacuum atmosphere are discharged from the vacuum chamber 4.2 via the vacuum connection 4.3 and separated in the collecting container 4.10. The degassed plastic melt collects in the sump 4.8 at the bottom of the housing 4.1 and leaves the degassing unit 4 via the melt outlet 4.7.

The degassed and filtered plastic melt passes from the melt outlet 4.7 into the discharge extruder 5. The discharge extruder 5 conveys the plastic melt to a discharge pump 6, which feeds the final filter unit 7 in order to carry out a final filtration of the plastic melt before final processing. Final processing is carried out by granulation in the granulating device 9. The granules produced are illustrated here by way of example in a granule container 9.1 (as shown in FIG. 1). The granules can now be extruded directly in a melt spinning unit for producing threads or for producing films. A high degree of purity is produced by the multi-stage filtration of the plastic melt and the degassing of the plastic melt integrated with the second filtration. The multi-stage filtration makes it possible for substantially all solid foreign particles to be removed from the plastic melt.

In principle, however, there is also the possibility that, immediately after melting and purification, the recyclable material is fed to a final processing unit which extrudes fibers or films. In this connection, FIG. 3 illustrates schematically a further exemplary embodiment of the device according to the invention for recycling plastics.

The exemplary embodiment according to FIG. 3 is substantially identical to the exemplary embodiment according to FIG. 1, and therefore only the differences are explained at this point and otherwise reference is made to the abovementioned description.

In order to be able to produce a higher intrinsic viscosity, particularly in the plastic melt, the degassing unit 4 is coupled to a dwell reactor 10. The degassing unit 4 is connected to the dwell reactor 10 on an outlet side in a bottom region 4.7. To this extent, the filtered and degassed plastic melt from the degassing unit 4 is fed directly to an inlet region of the dwell reactor 10. The dwell reactor 10 has a vacuum connection 10.2 on its outlet side. The vacuum connection 10.2 is connected to a separate vacuum pump (not shown here) or alternatively to the vacuum pump 4.11 of the degassing unit 4. Arranged within the dwell reactor 10 is a driven worm shaft 10.1, which feeds the plastic melt to a reactor outlet 10.3. A discharge extruder 5 is coupled directly to the reactor outlet 10.3 in order to discharge the filtered and degassed plastic melt. In this arrangement, the discharge extruder 5 is likewise followed by a discharge pump 6 and a final filter unit 7. The final filter unit 7 is arranged upstream of the final processing unit 8. In this case, the final processing unit 8 is formed by an extrusion device 13, which has a plurality of spinnerets 10.1 for extruding fibers.

In the exemplary embodiment illustrated in FIG. 3, the degassing and homogenization of the plastic melt is intensified still further by the additional dwell reactor 10. In this way, further gases released from the plastic melt can be removed via the vacuum connection 10.2. Using the example of a PET plastic melt, it was also possible to demonstrate that an intrinsic viscosity with an IV value of >0.8 can be achieved. To this extent, the exemplary embodiment illustrated in FIG. 3 is particularly suitable for carrying out direct final processing of the recycled plastic material.

In order, for example, to produce a colored plastic melt, the exemplary embodiment of the invention according to FIG. 4 is provided. The exemplary embodiment according to FIG. 4 is substantially identical to the exemplary embodiment according to FIG. 3, and therefore only the differences are explained at this point.

In the exemplary embodiment illustrated in FIG. 4, the finally filtered plastic melt is fed to a dynamic mixer 11. In principle, the dynamic mixer 11 could be replaced or even supplemented by a static mixer. Associated with the dynamic mixer 11 is a secondary extruder 12, by means of which an additive is fed into the plastic melt. Intensive mixing of the additive with the plastic melt takes place in the dynamic mixer 11. The plastic melt is then fed to the final processing unit 8, which in this exemplary embodiment is formed by a granulating device 9.

The exemplary embodiment illustrated in FIG. 4 is thus particularly suitable for producing conditioned plastic melts directly in the recycling process. To this extent, the exemplary embodiment illustrated in FIG. 4 is also well-suited to direct communication with an extrusion device 10 of a melt spinning unit.

The properties of the melt can also be adjusted by the method according to the invention and the device according to the invention in such a way that film extrusion and other applications are also possible. Direct feeding of the recycled melt into the main stream of a polymerization is also possible. In this way, all production waste can be returned to the production process. In this connection, FIG. 5 shows a further exemplary embodiment of the device according to the invention.

The exemplary embodiment illustrated in FIG. 5 is substantially identical to the exemplary embodiment according to FIG. 1, and therefore only the differences are explained below and otherwise reference is made to the abovementioned description.

In the exemplary embodiment illustrated in FIG. 5, a melt prepared from a recyclable material is fed to a main melt stream 15 by a discharge pump 6. The main melt stream 15 is produced by means of a polycondensation plant 14. In order to mix the recycled melt fed in with a production melt of the polycondensation plant, a mixer 11 is integrated in the main melt stream 15. The mixer 11 can be designed as a dynamic or static mixer or as a combination of both mixers.

The exemplary embodiment according to FIG. 5 can advantageously be used in all production plants processing polymer melts in order to continuously incorporate all the production waste produced into the process. It is likewise possible to feed a processed melt, consisting, for example, of PET flakes, to a PET melt. In this way, melt spinning plants for fiber and thread production or extrusion plants for film production, for example, can be operated without waste. The processed melt can of course also be fed directly into partial streams which are branched off from a main stream of a polycondensation unit.

The invention claimed is:

1. A method for recycling and processing plastics, comprising:
   in a plurality of successive process steps:
   1.1. melting a thermoplastic polymer using a melting extruder to provide a plastic melt;
   1.2. performing a first filtering of the plastic melt under a pressure of more than an atmospheric pressure;
   1.3. degassing during a second filtering of the plastic melt under a vacuum atmosphere, wherein degassing during the second filtering includes:
      passing the plastic melt output from the first filtering through a degassing unit to remove solid foreign particles and volatile gases from the plastic melt in a single process step, and
   1.4. discharging the plastic melt for final processing;
   wherein the degassing unit includes:
      a housing defining a melt inlet, a melt outlet, and a vacuum chamber disposed between the melt inlet and the melt outlet; and
      a filter element arranged within the vacuum chamber, the filter element having a hollow, elongated interior defining a pressure chamber connected to the melt inlet;
   wherein the filter element defines an inlet surface and an outlet surface, the outlet surface facing an interior of the vacuum chamber; and
   wherein the step of passing the plastic melt through the degassing unit includes:
      feeding the plastic melt through the inlet surface to the outlet surface to remove the solid foreign particles, and exposing the plastic melt to a vacuum of the vacuum chamber to remove the volatile gases.

2. The method as claimed in claim 1, wherein the solid foreign particles are taken up by the filter element and wherein the volatile gases are collected in the vacuum chamber and discharged.

3. The method as claimed in claim 2, wherein the vacuum atmosphere in the vacuum chamber is set to a vacuum in the range of from 0.5 mbar to 50 mbar.

4. The method as claimed in claim 3, wherein the plastic melt is collected in a sump of the vacuum chamber and is discharged through a melt outlet.

5. The method as claimed in claim 4, wherein after the second filtering, the plastic melt is fed under a vacuum atmosphere to a dwell reactor for homogenization and continuation of degassing.

6. The method as claimed in claim 5, wherein the plastic melt is filtered for a third time under an excess pressure atmosphere as the plastic melt is discharged for final processing.

7. The method as claimed in claim 6, wherein the plastic melt is mixed dynamically with an additive after the plastic melt is filtered for the third time.

8. The method as claimed in claim 6, wherein the plastic melt is mixed statically with an additive after the plastic melt is filtered for the third time.

9. The method as claimed in claim 1, wherein melting the thermoplastic polymer includes:
   processing a recyclable material through the melting extruder to provide the plastic melt; and
   wherein discharging the plastic melt for final processing includes:
   after degassing, providing the plastic melt for granulation or extrusion.

* * * * *